(12) United States Patent
Mitran et al.

(10) Patent No.: US 7,899,856 B2
(45) Date of Patent: Mar. 1, 2011

(54) HYSTERESIS FOR MIXED REPRESENTATION OF JAVA BIGDECIMAL OBJECTS

(75) Inventors: Marcel M. Mitran, Markham (CA); Alexander Steven Ross, Toronto (CA); Levon S. Stepanian, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 11/764,110

(22) Filed: Jun. 15, 2007

(65) Prior Publication Data
US 2008/0313612 A1    Dec. 18, 2008

(51) Int. Cl.
G06F 15/00 (2006.01)
G06F 9/44 (2006.01)

(52) U.S. Cl. .......................... 708/204; 717/116
(58) Field of Classification Search ........... 708/200, 708/204; 717/108, 116
See application file for complete search history.

(56) References Cited

U.S. PATENT DOCUMENTS 7,240,338 B1 * 7/2007 Bell et al. ............... 717/137
7,461,116 B2 * 12/2008 Allen ....................... 708/495
7,730,450 B2 * 6/2010 Mercer ..................... 717/120
2005/0065990 A1 * 3/2005 Allen ....................... 708/495
2005/0071810 A1 3/2005 Sutter et al.
2006/0107253 A1 5/2006 Sano et al.

OTHER PUBLICATIONS

Cowlishaw et al., "Fixed, floating, and exact computation with Java's BigDecimal", Dr. Dobb's Journal, vol. 29, No. 7, p. 22-7, Jul. 2004. http://www.ddj.com/dept/java/18440521?pgno=1.
BiGDecimal (Variable Precision Floating Library for Ruby), pp. 1-11, retrieved May 1, 2007. http://svn.ruby-lang.org/repos/ruby/trunk/ext/bigdecimal/bigdecimal_en.html#STRUCT.
"The BigDecimal class", IBM Corporation, 2000, 1 page, retrieved May 1, 2007. http://www2.hursley.ibm.com/decimalj/decclass.html.

* cited by examiner

*Primary Examiner* — Chuong D Ngo
(74) *Attorney, Agent, or Firm* — Yee & Associates, P.C.; David A. Mims, Jr.

(57) ABSTRACT

A computer implemented method for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a first counter is incremented. Responsive to the operation being biased towards a second representation type, a second counter is incremented. A counter reference is equal to a first value of the first counter subtracted from a second value of the second counter. Responsive to the counter reference exceeding a threshold number, representation of a subsequent number is changed from the first representation type to the second representation type.

23 Claims, 9 Drawing Sheets

| OPERATION | BIAS |
|---|---|
| USAGE OF MathContext.DECIMAL64 | HEAVY, TOWARDS DFP |
| CONSTRUCTION FROM STRING OBJECTS | HEAVY, TOWARDS DFP |
| CONSTRUCTION FROM INTEGERS | HEAVY, TOWARDS LONG |
| UNALIGNED ADDITIONS | MODERATE, TOWARDS DFP |
| BigDecimal TO STRING CONVERSION | MODERATE, TOWARDS DFP |
| ALIGNED ADDITION | MODERATE, TOWARDS LONG |
| MULTIPLICATION | LIGHT, TOWARDS LONG |
| DIVISION | HEAVY, TOWARDS DFP |
| ROUNDING | MODERATE, TOWARDS DFP |
| COMPARING BigDecimal | MODERATE, TOWARDS LONG |

FIG. 10

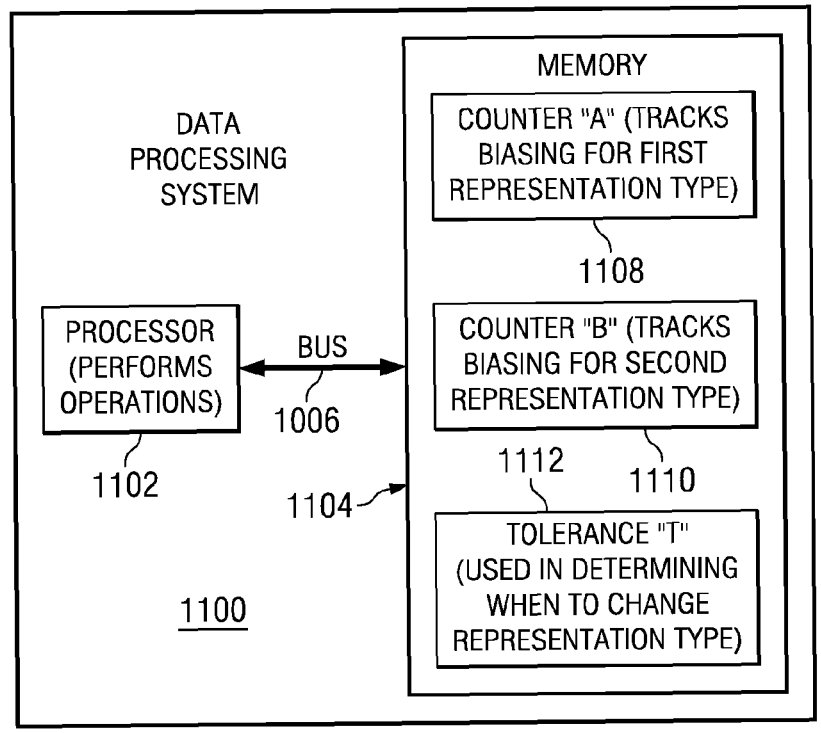

FIG. 11

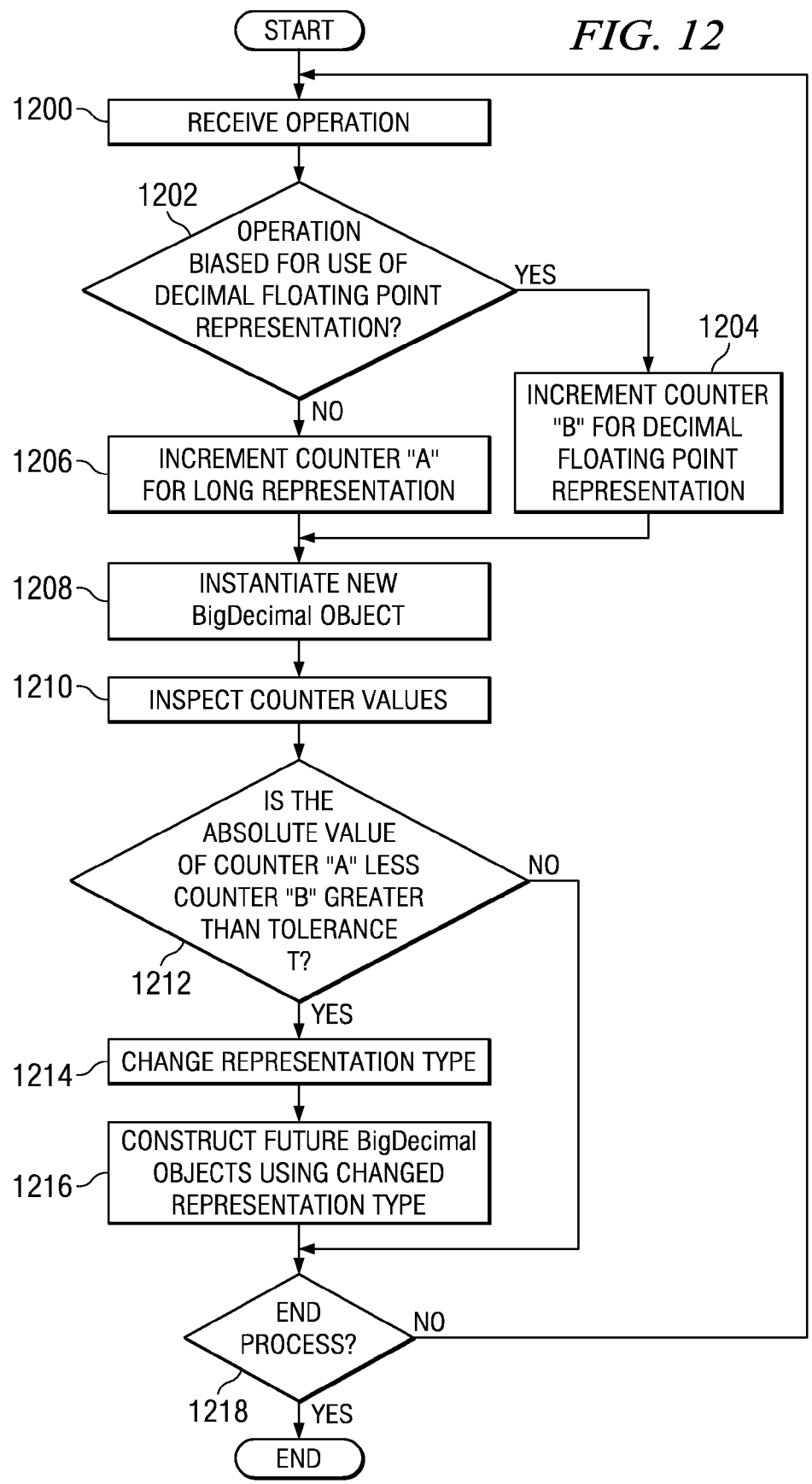

| CHARACTERISTIC OR OPERATION | WEIGHT |
|---|---|
| USE OF MathContext.DECIMAL64 | 5 TOWARDS DFP |
| CONSTRUCTING A BigDecimal FROM STRING | 4 TOWARDS DFP |
| CONSTRUCTING A BigDecimal FROM AN INTEGER | 3 TOWARDS LONG |
| UNALIGNED ADDITION | 3 TOWARDS DFP |
| ALIGNED ADDITION | 2 TOWARDS LONG |
| MULTIPLICATION | 0 BIAS |
| CONVERTING FROM DFP TO BASE-2 | 3 TOWARDS LONG |

*FIG. 14*

```
A1. CONVERT STRING DATA TO A BigDecimal X
A2. MULTIPLY X WITH A BigDecimal TAX RATE TX (0.10) TO PRODUCE TAX
A3. ADD X AND TAX TO A RUNNING BigDecimal SUM SUM USING A MathContext.DECIMAL64
A4. ADD TAX TO A RUNNING BigDecimal SUM TXSUM
```

*FIG. 15*

$$\begin{array}{r}3.9980\\+0.3998\\\hline 4.3978\end{array}$$

*FIG. 16*

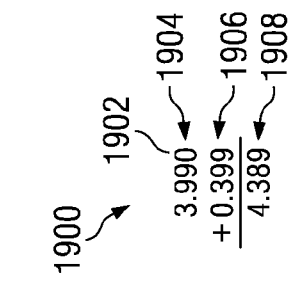
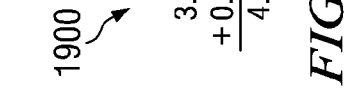
| ITERATION | X | TAX | SUM | TXSUM | LONG COUNTER | DFP COUNTER | PREFERRED FORMAT | GOOD DECISION? |
|---|---|---|---|---|---|---|---|---|
| 1 | 3.998 | 0.3998 | 4.3978 | 0.3998 | 4 | 12 | LONG | NO |
| 2 | 1.05 | 0.105 | 5.5528 | 0.5048 | 4 | 30 | LONG | NO |
| 3 | 1.10 | 0.11 | 6.7628 | 0.6148 | 6 | 45 | DFP | YES |
| 4 | 35.291 | 3.5291 | 45.5829 | 4.1439 | 8 | 60 | DFP | YES |
| 5 | 2.50 | .25 | 48.3329 | 4.3939 | 10 | 75 | DFP | YES |
| 6 | 9.323 | 0.9323 | 58.5882 | 5.3262 | 14 | 88 | DFP | YES |
| ... | ... | ... | ... | ... | ... | ... | ... | ... |
FIG. 17
```
A1. CONVERT INTEGER DATA TO A BigDecimal X
A2. MULTIPLY X WITH A BigDecimal TAX RATE TX (0.10) TO PRODUCE TAX
A3. ADD X AND TAX TO A RUNNING BigDecimal SUM SUM
A4. ADD TAX TO A RUNNING BigDecimal SUM TXSUM
```
FIG. 18
FIG. 19

| ITERATION | X | TAX | SUM | TXSUM | LONG COUNTER | DFP COUNTER | PREFERRED FORMAT | GOOD DECISION? |
|---|---|---|---|---|---|---|---|---|
| 1 | 3.99 | 0.399 | 4.389 | 0.399 | 7 | 3 | LONG | YES |
| 2 | 1.05 | 0.105 | 5.544 | 0.504 | 14 | 6 | LONG | YES |
| 3 | 1.10 | 0.11 | 6.754 | 0.614 | 19 | 12 | LONG | YES |
| 4 | 5.21 | 0.521 | 12.485 | 1.135 | 26 | 15 | LONG | YES |
| 5 | 2.50 | .25 | 15.235 | 1.385 | 31 | 21 | LONG | YES |
| 6 | 9.32 | 0.932 | 58.5882 | 5.3262 | 38 | 24 | LONG | YES |
| . | . | . | . | . | . | . | . | . |

```
INT32 COUNTERA=0; // TYPE A OCCURENCES
INT32 COUNTERB=0; // TYPE B OCCURENCES
BOOL FLAG=TYPEA;  // ARBITRARILY START WITH TYPE A
```
2100

*FIG. 21*

```
VOID INCREMENTTYPEACOUNTER(INT INC)
  {
  INT SUM=INC+COUNTERA;
  IF (((SUM ^ INC) & (SUM ^ COUNTERA)) >>> 31)
    COUNTERA=0X7FFFFFFF; // AVOID OVERFLOW
  ELSE
    COUNTERA += INC;
  }
VOID INCREMENTTYPEBCOUNTER(INT INC)
  {
  INT SUM=INC+COUNTERB;
  IF (((SUM ^ INC) & (SUM ^ COUNTERB)) >>> 31)
    COUNTERB=0X7FFFFFFF; // AVOID OVERFLOW
  ELSE
    COUNTERB += INC;
  }
```
2200

*FIG. 22*

```
INT32 DIFF=COUNTERA-COUNTERB;
IF (DIFF>T)
  {
  FLAG=TYPEA;
  COUNTERA=COUNTERB=0;
  }
ELSE IF (DIFF<(-T))
  {
  FLAG=TYPEB;
  COUNTERA=COUNTERB=0;
  }
```
2300

*FIG. 23*

HYSTERESIS FOR MIXED REPRESENTATION OF JAVA BIGDECIMAL OBJECTS

BACKGROUND OF THE INVENTION

1. Field of the Invention

The present invention relates generally to an improved data processing system and in particular to rapidly processing mathematical operations. Still more particularly, the present invention relates to determining how to represent a number in a data processing system.

2. Description of the Related Art

A design choice faced by software and hardware developers for modern computers is the decision of how to store numbers. Numbers can be stored as byte arrays, as classes of an object-oriented program language such as, for example, the BigDecimal class of the Java™ programming language. (Java and all Java-based trademarks are trademarks of Sun Microsystems, Inc. in the United States, other countries, or both.) Numbers can also be represented using different numbering systems. Numbering systems include a base-two representation and a base-ten representation. Base-ten representation, also known as decimal representation, is the numbering scheme with which most people are familiar. Base-two representation, also known as binary representation, uses only two digits, zero and one, and is the numbering scheme used by most computer systems.

The choice of number representation is an important design point from a performance perspective. The choice of number representation is closely tied to the characteristics of the numbers being used in a computer operation. In many computers, base-two representation is used to compute numbers, but base-ten (more easily human-readable) representation is used for input. To accommodate this scheme, a particular number may be converted from base-ten representation to base-two representation. An operation is then performed on the number, and the resulting output is converted back into base-ten representation.

However, a problem that can arise when performing this translation is inaccuracies in the final output due to inaccuracies in the conversion of certain numbers from decimal format to base-two format and back to decimal format. To overcome this problem, numbers are often stored as a class of an object-oriented programming language, often as immutable BigDecimal objects of the Java programming language.

Multiple underlying representations are possible for a BigDecimal object. In situations where two BigDecimal objects of different representations are operated on, it becomes costly to switch representations for one of the objects. Hence selecting the right representation when constructing BigDecimal objects is important.

SUMMARY OF THE INVENTION

Aspects of the present invention provide for a computer implemented method, computer program product, and data processing system for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a first counter is incremented. Responsive to the operation being biased towards a second representation type, a second counter is incremented. The second representation type is different than the first representation type. A counter reference is calculated. The counter reference is equal to a first value of the first counter subtracted from a second value of the second counter. Responsive to the counter reference exceeding a threshold number, representation of a subsequent number is changed from the first representation type to the second representation type. The subsequent number is generated after the counter reference exceeds the threshold number. For ease of reference, the subsequent number is stored.

In another illustrative embodiment, the second representation type is a preferred representation type. The preferred representation type can be a representation type for which the operation can be processed more quickly relative to the first representation type.

In another illustrative embodiment, changing representation further can include changing representation of the at least one number stored in the memory of the data processing system. At least one number generated prior to the counter reference exceeding the threshold number has a changed representation type.

In another illustrative embodiment, responsive to the counter reference being less than or equal to the threshold number, representation of the at least one number as the first representation type is retained. In another illustrative embodiment, the first representation type is a base-two number representation system and the second representation type is a base-ten number representation system. Conversely, the first representation type can be a base-ten number representation system and the second representation type can be a base-two number representation system.

In another illustrative embodiment, calculating and changing are performed responsive to instantiation of a new number stored as one of the class or a second class of the object-oriented programming language. In another illustrative embodiment, the first representation type and the second representation type are members of a set comprising three or more reference types.

In another illustrative embodiment, incrementing the first counter can include incrementing the first counter by a value greater than one. Similarly, in another illustrative embodiment, incrementing the second counter can include incrementing the second counter by a value greater than one.

Aspects of the present invention also provide for a computer implemented method for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a counter is either incremented or decremented. Responsive to the operation being biased towards a second representation type, the counter is incremented or decremented opposite the manner in which the counter is incremented or decremented in response to the operation being biased towards the first representation type. The second representation type is different than the first representation type. Responsive to satisfaction of both an absolute value of the counter exceeding a threshold number and to a sign of the counter favoring the second representation type, representation of a subsequent number is changed from the first representation type to the second representation type. The subsequent number is generated after the counter reference exceeds the threshold number. Optionally, the subsequent number is stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a table summarizing relative number system biases for operations of an exemplary software application, in accordance with an illustrative embodiment;

FIG. 11 is a block diagram of a data processing system for selecting a representation type of numbers stored in a data processing system, in accordance with an illustrative embodiment;

FIG. 12 is a flowchart illustrating a process for determining when to change a representation type of numbers stored in a data processing system, in accordance with an illustrative embodiment;

FIG. 14 is a table showing exemplary weights to be used in a process for determining when to change a representation type of numbers in a data processing system, in accordance with an illustrative embodiment;

FIG. 15 is an exemplary loop of operations of a software program, in accordance with an illustrative embodiment;

FIG. 16 is a mathematical operation performed by the loop shown in FIG. 15, in accordance with an illustrative embodiment;

FIG. 17 shows an exemplary output of the loop shown in FIG. 15, including the showing of when a change should be made from a first number representation type to a second representation type, in accordance with an illustrative embodiment;

FIG. 18 is an exemplary loop of operations of a software program, in accordance with an illustrative embodiment;

FIG. 19 is a mathematical operation performed by the loop shown in FIG. 18, in accordance with an illustrative embodiment;

FIG. 20 shows exemplary output of the loop shown in FIG. 18, including the showing of when a change should be made from a first number representation type to a second representation type, in accordance with an illustrative embodiment;

FIG. 21 shows exemplary pseudo code for defining two counter types, in accordance with an illustrative embodiment;

FIG. 22 shows exemplary pseudo code for incrementing counters, in accordance with an illustrative embodiment;

FIG. 23 shows exemplary pseudo code for determining whether a difference between two counters exceeds a threshold, in accordance with an illustrative embodiment.

DETAILED DESCRIPTION OF THE PREFERRED EMBODIMENT

Figure 1:
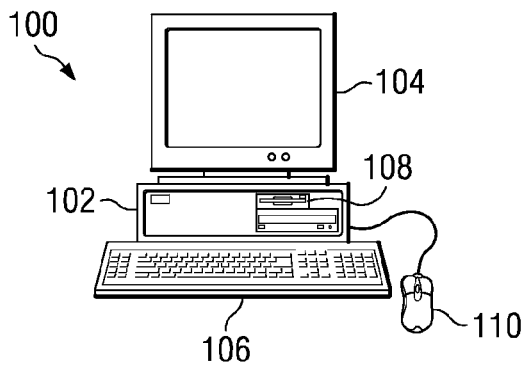
FIG. 1 is a pictorial representation of a data processing system in which the aspects of the present invention may be implemented.

With reference now to the Figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
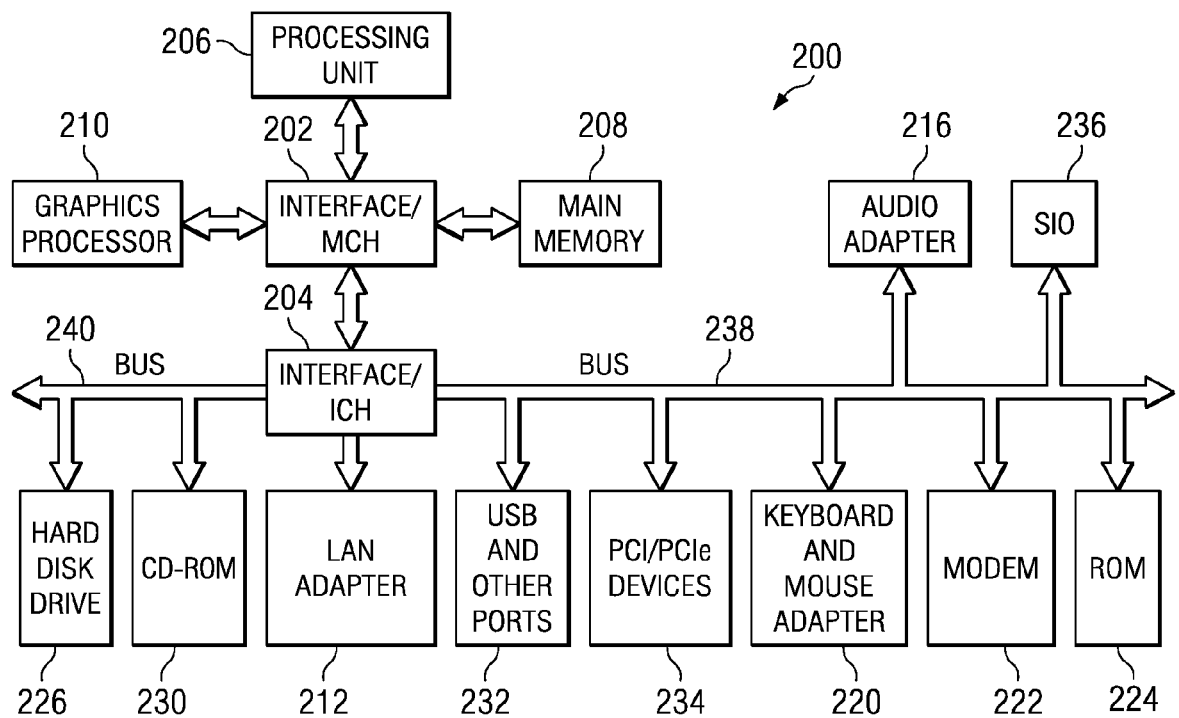
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system, such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200.

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache, such as that found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for determining how to represent a number in a data processing system. The methods of the present invention may be performed in a data processing system, such as data processing system 100 shown in FIG. 1 or data processing system 200 shown in FIG. 2.

As used herein, the following terms have the following meanings:

"Hysteresis" means the lagging of an effect behind a cause of the effect. As used with respect to the aspects of the present invention, "hysteresis" refers to a delay in a change between representation types for numbers stored in a memory.

A "class" in an object-oriented programming language is a model or template that can be used to create objects with a common definition and common properties, operations, and behavior.

An "object" in an object-oriented programming language is an instance of a class.

The term "BigDecimal" refers to an immutable class for the Java programming language. The BigDecimal class provides for representation of a number for use in decimal, floating-point arithmetic.

The term "instantiated", with respect to object-oriented programming languages, refers to a process of creating a specific object which is a member or instance of a class.

Aspects of the present invention provide for a computer implemented method, computer program product, and data processing system for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a first counter is incremented. Responsive to the operation being biased towards a second representation type, a second counter is incremented. The second representation type is different than the first representation type. A counter reference is calculated. The counter reference is equal to a first value of the first counter subtracted from a second value of the second counter. Responsive to the counter reference exceeding a threshold number, representation of a subsequent number is changed from the first representation type to the second representation type. The subsequent number is generated after the counter reference exceeds the threshold number. For ease of reference, the subsequent number is stored.

Aspects of the present invention also provide for a computer implemented method for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a counter is either incremented or decremented. Responsive to the operation being biased towards a second representation type, the counter is incremented or decremented opposite the manner in which the counter is incremented or decremented in response to the operation being biased towards the first representation type. The second representation type is different than the first representation type. Responsive to satisfaction of both an absolute value of the counter exceeding a threshold number and to a sign of the counter favoring the second representation type, representation of a subsequent number is changed from the first representation type to the second representation type. The subsequent number is generated after the counter reference exceeds the threshold number. Optionally, the subsequent number is stored.

Figure 3:
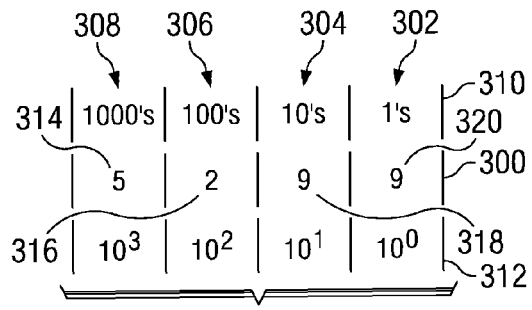
FIG. 3 shows a number represented in base-ten representation.
Figure 4:
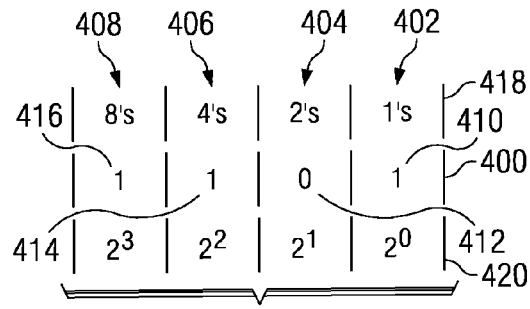
FIG. 4 shows a number written in base-two representation.

FIG. 3 and FIG. 4 show two different representation types for representing numbers. In particular, FIG. 3 shows a number represented in base-ten representation. Row 300 shows the number "5,299" represented in decimal format. This type of number representation is the type of representation with which most people are familiar. In decimal representation, column 302 represents "1's", column 304 represents "10's", column 306 represents "100's", and column 308 represents "1000's". Thus, for example, the number in row 300 can be read as five groups of one thousands, two groups of one hundreds, nine groups of tens, and nine groups of ones, as shown in row 310.

Another way of thinking about the number "5,299" in row 300 is to represent numbers in columns 302 through 308 as powers of ten. Thus, as shown in row 312, number 320 represents a number multiplied by "$10^{0}$", number 318 in column 304 represents a number multiplied by "$10^{1}$", number 316 in column 306 represents a number multiplied by "$10^{2}$", and number 314 in column 308 represents a number multiplied by "$10^{3}$". Thus again, the number "5" 314 in row 300 represents a number of one thousands, which is equal to "$10^{3}$". For this reason, the number "5" 314 in row 300 represents 5 times 1000=5000. Similarly, the number "2" 316 in row 300 represents a number of hundreds, which is equal to $10^{2}$. For this reason, the number "2" 316 in row 300 represents 2 times 100=200.

To determine the complete number represented in FIG. 3, the value of each column is added together. Thus, the numbers "5000" and "200" are added together to form "five thousand, two hundred." This process is continued for numbers 318 (9) and 320 (also 9) in columns 304 and 302. Each time, the resulting number in a column is added to the running total. In other words, the decimal number 5,299 can be read as "five thousand plus two hundred plus ninety plus nine." The total result is referred-to as "five thousand, two hundred and ninety-nine." In this example, the number 5,299 is represented using consecutive powers of ten.

FIG. 4 shows a number written in base-two representation. The number representation type shown in FIG. 4 is different from the number representation type shown in FIG. 3.

The principle of representing numbers in the base-two type representation shown in FIG. 4 is the same as the principle shown in FIG. 3 for base-ten representation of numbers. In particular, the numbers in row 400 can be thought of as being arranged into columns, such as columns 402, 404, 406, and 408. Number 410 in column 402 represent "1's", number 412 in column in 404 represent "2's", number 414 in column 406 represent "4's", and number 416 in column 408 represents "8's", as shown in row 418.

Similarly, as shown in row 420, number 410 in column 402 represents a number multiplied by "$2^{0}$", number 412 in column 404 represents a number multiplied by "$2^{1}$", number 414 in column 406 represents a number multiplied by "$2^{2}$", and number 416 in column 408 represents a number multiplied by "$2^{3}$".

Returning to FIG. 3, in the number representation type shown in FIG. 3, one cannot represent the number "10" in the first column alone, because numbers in any one column can only vary between zero and nine. Therefore, to represent the number "10" in decimal representation shown in FIG. 3, the number "1" must appear in column 304 and the number "0" must appear in column 302. This scheme can be read in long form as "one group of 10' and no groups of 1's." Accordingly, the number represented is "10."

Similarly, with respect to the base-two representation type shown in FIG. 4, one cannot represent the decimal number "2" using a number in column 402 alone because the only available numbers are "0" and "1". Instead, the number in column 404 must be incremented by one to represent the decimal number of "2". Thus, for example, the decimal number "2" would be represented by a number "1" 412 in column 404 and a number "0" 410 in column 402. This representation would provide that one value of "$2^{1}$" exists in column 404 and no values of "$2^{0}$" exist in column 402.

As with decimal representation, the resulting numbers in each column are added together to create the final value of the represented number. In long form, the number is read as "1×2+0×1", or one group of 2's and no groups of 1s. In decimal form, 2+0=2. Thus, the number "10" in base-two representation is equivalent to the number "2" in base-ten decimal representation. Note that the number "10" in base-two representation is not the number "ten" in base-ten decimal representation. No English word exists to describe the number "10" as written in base-two representation, though this number could be considered "two" in decimal representation.

Likewise, to achieve the number "3" in base-two representation one would include a "1" in column 404 and a "1" in column 402. This number would represent a value of "$1×2^{1}$" from column 404 and a value of "$1×2^{0}$" from column 402, which would yield, in base-ten representation, "2+1=3". In base-two representation this number is "11".

Along the same lines, the number "4" in base-ten representation is denoted in base-two representation by reference to column 406. Thus, the number "4" in base-ten representation would be represented by "100" in columns 406, 404, and 402, respectively, in base-two representation. Stated differently, the number "4" in base-ten representation would be represented, in base-two representation, by "1, 0, 0" in columns 406, 404, and 402, respectively.

Thus, for example, if one were to convert the number "1101" in base-two representation shown in row 400 into decimal representation, then that number would be "$1×2^{3}=8$" for number 416 shown in column 408, plus "$1×2^{2}=4$" for number 414 shown in column 406, plus "$0×2^{1}=0$" for number 412 shown in column 404, plus "$1×2^{0}=1$" for number 410 shown in column 402. Continuing in decimal format, "8+4+1=13". Therefore, the number "1101" in base-two representation is equal to the number "13" in base-ten representation.

In either base-ten representation or base-two representation, any number of any size can be generated by adding additional columns to the left of column 308 in FIG. 3 or column 408 in FIG. 4. Most people are more familiar with the base-ten representation; therefore, that number system is used most often with respect to user input and output. Most computers perform better using base-two representation; therefore, that number system is usually used by computers. To accommodate the difference between human users and computers in this regard, the computer often converts numbers from base-ten representation to base two representation and then back again into base-ten representation.

Figure 5:
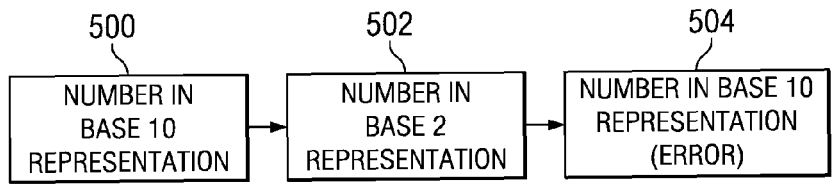
FIG. 5 is a block diagram illustrating a process of changing a number from base-ten representation to base-two representation, and back into base-ten representation.

FIG. 5 is a block diagram illustrating a process of changing a number from base-ten representation to base-two representation and back into base-ten representation. Because most computers can be thought of as comprising a very large number of switches that vary between on and off, these switches can be thought of as representing the numbers zero and one. Hence, computers naturally use base-two number representation, even though most human users prefer base-ten representation.

However, errors often occur during the conversion of numbers from base-two representation to base-ten representation in many computers. This problem is particularly severe in the case of large numbers. A large number can be any number that requires more than one column to represent, such as, for example, the number "3" in base-two representation or the number "10" in base-ten representation.

As shown in FIG. 5, a number in base-ten representation input by a user in block 500 is converted to base-two representation in block 502 and then is reconverted to base-ten representation in block 504.

However, an error often occurs. For example, the number "0.35" in base-ten representation cannot be accurately represented with a finite precision base-two number system. When converting the number "0.35" in base-ten representation to a binary base-two number system, and then converting back to a base-ten representation, the returned number is "0.34999999999999996" instead of "0.35". Although this returned number is very close to the precise number of "0.35" this type of error can be unacceptable. Particularly with respect to financial applications, precise calculations are required.

An additional concern relating to the conversion of numbers between different number representation schemes is the performance impact upon an application. The act of converting numbers between different number systems takes processing power and time. Particularly with respect to large numbers or large groups of numbers, this conversion can slow down operations of an application. Avoidance of this performance impact is desired.

Figure 6:
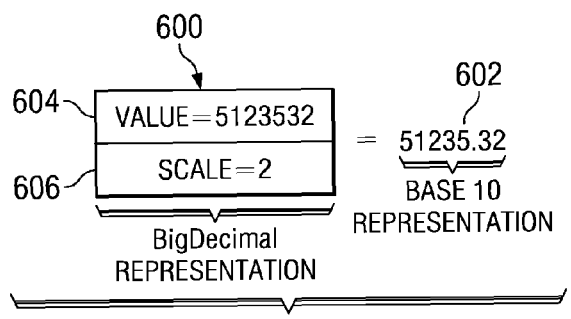
FIG. 6 is a prior art representation of a number using a BigDecimal object having a 64-bit signed long field and having a 32-bit signed integer field for a scale.

FIG. 6 is a prior art representation of a number using a BigDecimal object having a 64-bit signed long field and having a 32-bit signed integer field for a scale. The method of representing numbers shown in FIG. 6 overcomes the accuracy problem of converting numbers from base-ten representation to base-two representation, and back into base-ten representation, as shown in FIG. 5.

The prior art method for overcoming the accuracy problem shown in FIG. 5 is to represent a number using a class of an object-oriented programming language. BigDecimal class definition 600 represents the base-ten representation number "51,235.32", as shown by arrow 602.

The BigDecimal class is designed to solve two types of problems that are associated with floating point numbers. Generally, in computer programming a "floating point" number is a number which contains a decimal point, such as "3.14" or "1092.453", as opposed to a pure integer, such as "2" or "316". The first problem solved is that the BigDecimal class can be used to exactly represent a number in decimal format or a number in base-two format. The second problem solved is that the BigDecimal class can be used to work with numbers that have more than sixteen significant digits.

The BigDecimal class is an immutable, arbitrary precision, signed decimal number representation. A BigDecimal class is comprised of an unscaled value of any precision, as shown in box 604, and a signed 32-bit integer scale number as shown in box 606. A positive 32-bit integer scale represents the number of digits to the right of the decimal point in base-ten representation. If the scale is negative, the unscaled value is multiplied by ten to the power of the negation of the scale. Therefore, the number represented by the BigDecimal class is the unscaled value shown in box 604 multiplied by $10^{-scale}$, as shown in box 606. The BigDecimal class provides operations for basic arithmetic, scale manipulation, comparison, and format conversion.

The BigDecimal class is a class for use in the Java programming language. Java is an object-oriented programming language. In object-oriented programming, a class is a model or template that can be used to create objects with a common definition and common properties, operations, and behavior. An object is an instance of a class. A method, called a function in some languages, is a set of instructions that are specific to a class.

Thus, a class defines the abstract characteristic of a thing or object, including the characteristics and the behaviors that the thing can do. For example, the class "dog" would consist of traits shared by all dogs; for example, breed, fur color, and the ability to bark. An object is a particular instance of a class. Thus, for example, the class "dog" defines all possible dogs by listing the characteristic that they can have. An object "Spot" is one particular dog, with a particular version of the defined characteristics of the class. Thus, for example, the class "dog" has the characteristic "breed", and the object "Spot" has a specific "breed" of "beagle." In object-oriented programming, the object "Spot" is an instance of the class "dog."

The set of values of the attributes of a particular object is called the state of the object. An object's abilities, such as, for example, the ability of class "dog" to bark, are methods of the class "dog." Within a program, using a method should only affect one particular object. For example, all dogs can bark, but one particular dog actually does the barking.

In this context, the Java BigDecimal class can be understood. BigDecimal class definition 600 in FIG. 6 is a class of the Java object-oriented programming language. Thus, the BigDecimal class can have objects, which can be, for example, the base-ten representation number 51,235.32 as shown by arrow 602. BigDecimal class definition 600 can have a variety of methods, such as arguments that can be applied to BigDecimal class definition 600. These arguments can be used to manipulate the number 51,235.32 using functions, which can also be referred-to as methods, of BigDecimal class definition 600. The BigDecimal class definition 600 is immutable, that is, the BigDecimal class cannot be changed once instantiated. The BigDecimal class definition 600 can be used to perform precise calculations with numbers, including precise conversion of numbers between base-ten representation and base-two representation and back from base-two representation to base-ten representation.

Thus, the BigDecimal class definition 600 solves the accuracy problem described with respect to FIG. 5. However, the problem associated with the computing overhead associated with converting those numbers remains. Thus, different methods for representing numbers have been created, as shown with respect to FIG. 7 through FIG. 9. The illustrative example of FIG. 6 shows a BigDecimal object using a 64-bit signed long field to represent the unscaled value and having a 32-bit signed integer field for a scale. FIG. 6 specifically represents the decimal number 51,235.32.

Figure 7:
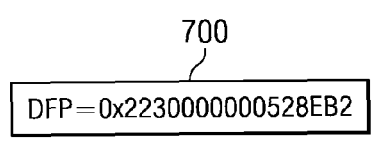
FIG. 7 is a prior art representation of the same BigDecimal object in FIG. 6, using a 64-bit decimal floating point representation.

FIG. 7 is a prior art representation of the same BigDecimal object in FIG. 6, using 64-bit decimal floating point representation. Representation 700 is a BigDecimal object using a 64-bit decimal floating point representation of the number 51,235.32.

Figure 8:
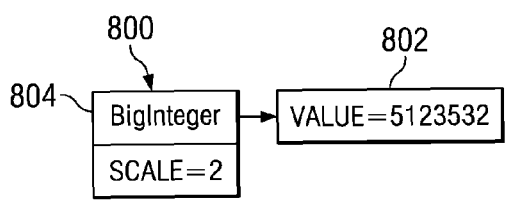
FIG. 8 is a prior art representation of a number using a BigDecimal object having a BigInteger reference and having a 32-bit signed integer field for a scale.

FIG. 8 is a prior art representation of a number using a BigDecimal object having a BigInteger reference and having a 32-bit signed integer field for a scale. BigDecimal class 800 represents a BigDecimal representation that references a BigInteger object. In the example shown in FIG. 8, BigInteger object 802 is an object of the BigInteger class. BigDecimal object 800 references BigInteger object 802. BigDecimal class 800 has a scale of two. Therefore, BigDecimal class 800 together with BigInteger object 802 represent the number 51,235.32. BigDecimal class 800 can have different references for the BigInteger shown in block 804. For example, BigInteger object 802 could reference any number of different values and, in doing so BigDecimal class 800 can represent many different numbers.

Figure 9:
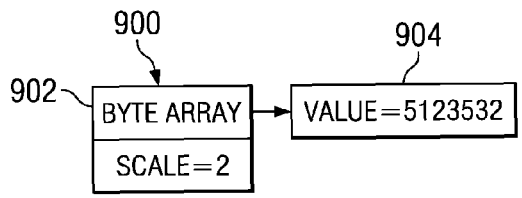
FIG. 9 is a prior art representation of a number using a BigDecimal object having a byte array reference and having a 32-bit signed integer field for a scale.

FIG. 9 is a prior art representation of a number using a BigDecimal object having a byte array reference and having a 32-bit signed integer field for a scale. Similar to the example shown in FIG. 6, BigDecimal object 900 uses byte array 902 to reference the value 5123532, as shown by arrow 904. Thus, when BigDecimal class 900 is instantiated with the reference shown in FIG. 9, the value 51,235.32 results.

FIG. 10 is a table summarizing relative number system biases for operations of an exemplary software application, in accordance BigDecimal class definition with an illustrative embodiment. The table shown in FIG. 10 shows exemplary operations favoring, to varying degree, either base-two number representation or base-ten number representation.

As described above, the choice of number representation is an important design point from a performance perspective, and is closely tied to the characteristics of the numbers being operated on. Examples of representations of numbers are shown with respect to FIG. 3 through FIG. 9. For example, the 64-bit base-two representation, also known as a long representation, uses an underlying base-two representation. For this reason, addition or subtraction of unaligned numbers requires shifting of a decimal point. This shifting is performed by multiplying or dividing by a power of ten, which is expensive computationally. However, addition and subtraction of numbers that happen to be aligned can be significantly faster if executed using the inherent base-two representation hardware that is standard in most modern processors.

Having to mix representations for operands is undesirable, as moving from one representation type to another representation type incurs heavy overhead of repeated multiplication and/or division to move between base-two and base-ten representations. With the onset of decimal floating point hardware, which is a new form of hardware for computers, the issue of mixed representation of numbers is further amplified. The problem of unaligned operations is amplified as these operations are typically faster when performed by decimal floating point hardware, but aligned operations continue to be dominantly faster using the long base-two representation. Hence, the choice of representation type for numbers can have a profound effect on the performance of future operations of a particular program.

The aspects of the present invention provide for a framework for selection of a representation type for numbers based on prior use of BigDecimal objects in a lifetime of a software application, assuming that at least two preferable representations exist. FIG. 10 describes relative biasing towards one type of representation over another type of representation. The two types of representations described with respect to FIG. 10 are decimal floating point representation (DFP) and long representation, which is a 64-bit base-two representation type for numbers. Certain operations are biased towards one representation type over the other representation type with respect to the processing overhead used to perform a given operation.

In particular, table 1000 in FIG. 10 shows operations in column 1002 and the relative bias in column 1004. As an illustrative example, an operation of usage of unaligned additions, in cell 1006, has a moderate bias towards decimal floating point representation, as shown in cell 1008. In other words, when performing unaligned additions of numbers, relatively speaking, numbers that are represented using decimal floating point representation can be processed moderately faster than numbers represented using long representation.

Similarly, comparison of BigDecimal classes, as shown in cell 1010, is an operation having a moderate bias towards long representation of numbers, as shown in cell 1012. Thus, when comparing BigDecimal classes to each other, the operation is performed moderately faster using long representation relative to use of decimal floating point representation. Other biases and their relative weights are shown with respect to the remaining cells in table 1000. The information shown in table 1000 of FIG. 10 can be used to determine when to change representation types of numbers in order to maximize the overall execution efficiency of a software program.

FIG. 11 is a block diagram of a data processing system for selecting a representation type of numbers stored in a data processing system, in accordance with an illustrative embodiment. Data processing system 1100 can be data processing system 100 shown in FIG. 1 or data processing system 200 shown in FIG. 2. Similar to those data processing systems, data processing system 1100 contains processor 1102 coupled to memory 1104 by bus 1106.

Processor 1102 performs operations of one or more software programs. Software programs can include operating systems, financial software programs, web servers, or any other software for data processing systems. Memory 1104 contains data structures for defining two counters, including counter "A" 1108 and counter "B" 1110. Counter "A" 1108 is used for tracking biasing for a first representation type and counter "B" 1110 is used for tracking biasing for a second representation type. Each representation type is a type of number representation used by operations calculated by processor 1102. Memory 1104 also includes a data structure for defining tolerance "T" 1112. Tolerance "T" 1112 is used to aid in determining when to change representation type.

In particular, the illustrative embodiments described herein increment counter "A" if an operation performed in processor 1102 is biased towards the first representation type and increments counter "B" if an operation performed in processor 1102 is biased towards the second representation type. The amount that a particular counter is incremented varies depending on the amount of bias. Thus, for example, a heavy bias can increment a counter by many numbers, a light bias can increment a counter by one or two numbers, and a moderate bias can increment a counter by several numbers or more.

In an illustrative embodiment, a difference is calculated between counter "A" 1108 and counter "B" 1110. If this difference is greater than tolerance "T" 1112, then a determination is made that the present representation type should be changed for numbers to be used in subsequent operations. Thus, for example, if numbers are represented using a first representation type and the difference between counter "A" 1108 and counter "B" 1110 exceeds a pre-determined value for tolerance "T" 1112, then subsequently generated numbers used by the application will be converted into the second representation type. Thus, numbers generated after the threshold is exceeded are stored as a new representation type. In another illustrative embodiment, previously stored numbers referenced by the operation, or other numbers, can also be changed to the new representation type.

The value of tolerance "T" 1112 determines how easily the switch between representation types will take place. If the value of tolerance "T" 1112 is large, then a large difference in bias between counter "A" 1108 and counter "B" 1110 will be required before the representation type of numbers used by the application is changed. Conversely, if the value of tolerance "T" 1112 is relatively small then representation types would change frequently. The decision as to the value at which tolerance "T" 1112 is to be set depends on a variety of factors including, but not limited to, the amount of overhead required to transform numbers between the first representation type and the second representation type.

In an illustrative embodiment, numbers are stored as BigDecimal classes or objects. Upon instantiation of the new BigDecimal object, counter "A" 1108 and counter "B" 1110 are inspected. If the two counters have an absolute difference that is greater than tolerance "T" 1112, and the winning count is different then a defined flag value, which represents the current representation type, then the flag value is flipped. In this case, BigDecimal objects or classes are constructed using the new representation type.

BigDecimal objects are typically used in financial applications to represent dollar and cent values. In this context, instances of the BigDecimal class are typically constructed from strings that are loaded from a database. Typical operations include multiplication of tax and interest rates, and returning a representation to a string for storing in a database.

For many applications, most BigDecimal values can be represented using no more than sixteen significant figures. In this case, two possible representations of such numbers are interesting, decimal floating point format as defined by IEEE754r (referred to commonly as DFP), and a 64-bit fixed point base-two representation (referred to as a long representation).

The better choice for a BigDecimal class or object depends on the type of operation used by an application. For example, as shown with respect to FIG. 10, a decimal floating point representation will perform faster if a MathContext.DECIMAL64 parameter is used for the BigDecimal operators. If BigDecimal operators do not use this descriptor to constrain the precision of results, the default representation of the numbers should be heavily biased to the long representation.

Decimal floating point representation is typically faster when the BigDecimal object is constructed from a string and added to another decimal floating point number that has a different scale divided, rounded, or converted to a string object. Alternatively, the long representation is faster when constructed from an integer and added to another long representation number that has the same scale.

As described above, aspects of the present invention use a pair of counters to represent relative bias for each representation type. The corresponding biases are adjusted by incrementing the respective counters when a processor encounters preferred operations. Instruction timings and micro benchmarking help determine relative performance characteristics, which are then used to determine the associated increments of each operation. For instance, the benefit of constructing BigDecimal objects from strings using decimal floating point representation is much larger then the benefit of performing addition that is friendly to decimal floating point representation. Table 1000 shown in FIG. 10 summarizes relative biases for each of a number of operations for a financial application.

FIG. 12 is a flowchart illustrating a process for determining when to change a representation type of numbers stored in a data processing system, in accordance with an illustrative embodiment. The process shown in FIG. 12 can be implemented in a data processing system, such as data processing system 100 shown in FIG. 1, data processing system 200 shown in FIG. 2, and data processing system 1100 shown in FIG. 11. The processes shown in FIG. 12 can be performed by a processor, such as processor 1102 shown in FIG. 11.

The process begins as a processor receives an operation of a software program (step 1200). In this illustrative embodiment, the number representation type starts at long, base-two representation. The processor then determines if the operation is biased towards use of decimal floating point representation (step 1202). If the operation is biased towards use of decimal floating point representation, then the processor increments counter "B", which is a counter representing a bias towards decimal floating point representation (step 1204). On the other hand, if the operation is not biased in favor of decimal floating point representation, then in this illustrative example the operation is assumed to be biased towards long representation at step 1202. In this case, the processor increments counter "A" for long representation (step 1206). In other illustrative embodiments, additional counters can be added for tracking multiple representation types of numbers.

Next, the processor instantiates a new BigDecimal object (step 1208). In response, the processor inspects the values for counter "A" and counter "B" (step 1210). In other illustrative embodiments, counter values for additional counters can be inspected. Next, the processor determines whether the absolute value of counter "A" less counter "B" is greater then tolerance "T" (step 1212). In other illustrative embodiments, a comparison among multiple counters is made with respect to possible multiple tolerances.

If the absolute value of counter "A" less counter "B" is greater than tolerance "T," then the processor changes the representation type for numbers stored with respect to the software application performing the operation received at step 1200 (step 1214). In another illustrative embodiment, if the current choice of number representation type is already favored, then the current choice of representation type is not changed even if the value of "T" exceeds the threshold. Once the representation type is changed, the processor then constructs future BigDecimal objects using the changed representation type (step 1216).

In other illustrative embodiments, multiple comparisons between multiple tolerances and/or multiple comparisons among multiple counters can be performed in order to determine which of a number of representation types should be used with respect to numbers used by one or more software applications. In other words, a first counted representation type and a second counted representation type can be members of a set including three or more reference types, with each of the three or more reference types being counted and compared with each other using one or more threshold values. In yet other illustrative embodiments, the processor can change the representation type of existing numbers already stored in the data processing system, possibly in anticipation of re-using those already stored numbers in future operations.

The processor then determines whether to end the process shown in FIG. 12 (step 1218). Likewise, if the absolute value of counter "A" less counter "B" is not greater then tolerance "T" at step 1212, then the process also moves to step 1218 for determination of whether the entire process should end. If the process should not end, then the process returns to step 1200 and repeats. Otherwise, the process terminates.

Figure 13:
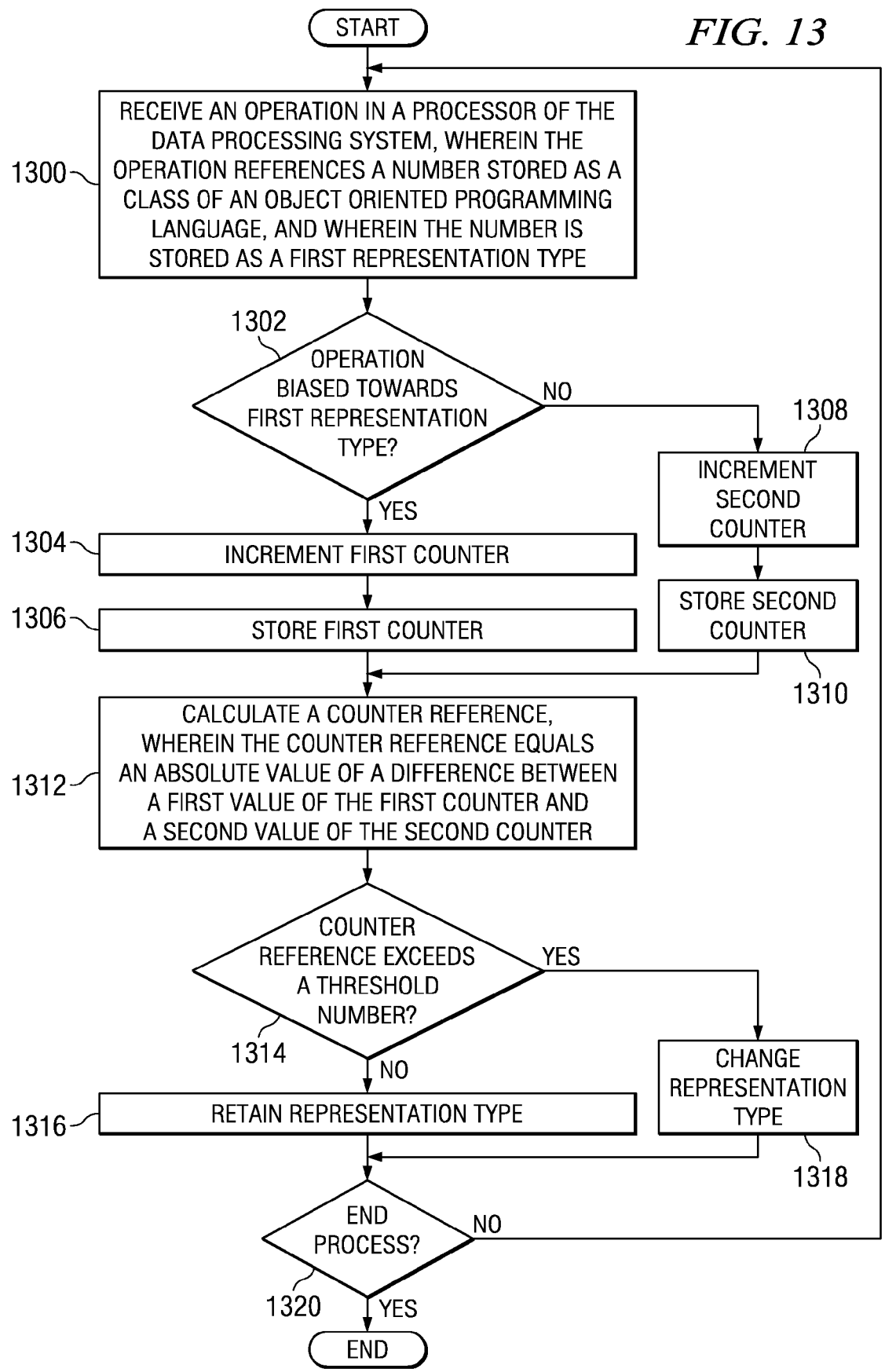
FIG. 13 is a flowchart of a process for determining when to change a representation type of numbers stored in a data processing system, in accordance with an illustrative embodiment.

FIG. 13 is a flowchart of a process for determining when to change a representation type of numbers stored in a data processing system, in accordance with an illustrative embodiment. The process shown in FIG. 13 can be implemented in a data processing system, such as data processing system 100 shown in FIG. 1, data processing system 200 shown in FIG. 2, or data processing system 1100 shown in FIG. 11. In particular, the process shown in FIG. 13 can be implemented by a processor, such as processor 1102 shown in FIG. 11.

The process begins as an operation is received in a processor, wherein the operation references a number stored as a class of an object-oriented programming language, and wherein the number is stored as a first representation type (step 1300). The processor then determines whether the operation is biased towards the first representation type (step 1302). If the operation is biased towards the first representation type, then the processor increments a first counter (step 1304). The amount by which the first counter is incremented can vary based on how heavily the operation is biased towards the first representation type. The processor then stores the updated first counter in a memory of the data processing system (step 1306).

Returning to step 1302, if the operation is not biased towards the first representation type, then the operation is presumed to be biased towards the second representation type. As a result, the processor increments the second counter (step 1308). The processor then stores the updated second counter in a memory of the data processing system (step 1310).

After step 1310 or after step 1306, the processor calculates a counter reference, wherein the counter reference equals an absolute value of the difference between the first value of the first counter and a second value of the second counter (step 1312). This calculation can be performed responsive to instantiation of a new BigDecimal object in the flow of the software program of which the operation is a part.

The processor then determines whether the counter reference calculated at step 1312 exceeds a threshold number (step 1314). If the counter threshold does not exceed a threshold number, then the processor retains the current representation type (step 1316). (Note that step 1316 is shown for ease of reference; no particular action may actually be required to retain the current representation type.) Otherwise, if the counter reference exceeds a threshold number, then the processor changes the representation type for subsequently generated numbers in the data processing system with respect to the software application of which the operation is a part (step 1318). Thus, numbers generated after the threshold has been exceeded are stored as a new representation type. In another illustrative embodiment, previously stored numbers referenced by the operation, or other numbers, can also be changed to the new representation type.

The processor then determines whether to end the process (step 1320). If the process should continue (a "no" result to step 1320), then the process returns to step 1300 and repeats. Otherwise, the process terminates.

FIG. 14 through FIG. 17 provide a first example of aspects of the illustrative embodiments. In particular, FIG. 14 through FIG. 17 represent actions of a financial application, tracking of two different counters with respect to different representation types for numbers used by the financial application, and relative biases for each representation type. In the following example, all values are represented with sixteen digits or fewer.

In particular, FIG. 14 shows relative biases or weights for different characteristics or operations of a financial application. Table 1400 shows the characteristics or operations in column 1402 and, in column 1404, shows the corresponding relative weights or biases towards one number representation type.

FIG. 14 is a table showing exemplary weights to be used in a process for determining when to change a representation type of numbers in a data processing system, in accordance with an illustrative embodiment. Thus, for example, use of MathContext.DECIMAL64 shown in cell 1406 results in a weight or bias of five towards decimal floating point (DFP) representation, as shown in cell 1408. On the other hand, converting a number from decimal floating point representation to base-two representation as shown in cell 1410 results in a relative weight or bias of three towards 64-bit base-two long representation, as shown in cell 1412. Other characteristics or operations, and their associated weights or biases, are shown in the remaining cells of table 1400 but are not expressly enumerated.

FIG. 15 is an exemplary loop of operations of a software program, in accordance with an illustrative embodiment. The loop shown in FIG. 15 can be implemented in a data processing system, such as data processing system 100 shown in FIG. 1, data processing system 200 shown in FIG. 2 or data processing system 1100 shown in FIG. 11. In particular, loop 1500 is a loop of a segment of a financial application having characteristics or operations as described with respect to FIG. 14. In loop 1500, an assumption is made that decimal floating point operations do not overflow the representation.

Loop 1500 converts string data from, for example, a database to a BigDecimal number "X". Loop 1500 multiplies "X" with a BigDecimal tax rate of 0.10 to produce a number "TAX". Loop 1500 then adds the number "X" and "TAX" to a running BigDecimal sum "SUM" using MathContext.DECIMAL64. Loop 1500 then adds the tax "TAX" to a running BigDecimal sum "TXSUM". In this way, loop 1500 creates a number that is the sum of a price of an object plus the tax associated with sale of that object.

In an illustrative example, loop 1500 is performed with respect to six different values. Each value of "X" represents a price or sale of one item. On the first iteration of loop 1500 "X"=3.998 in decimal representation, the construction of the BigDecimal object from a string causes an increment to the decimal floating point bias by four. Thus, the counter associated with decimal floating point bias is incremented by four. Multiplying the number "X" by a ten percent tax results in "TAX"=0.3998, which results in no additional bias towards either number representation type. Adding the number "X" and the number "TAX" requires padding the number "X"=3998 with a zero, as shown with respect to operation 1600 shown in FIG. 16. In particular, the number zero at arrow 1602 is added to the number 3.998 so that an aligned operation can occur when the number 3.9980 is added to the number 0.3998. The illustrative example shown in FIG. 16 shows an unaligned addition. This unaligned addition increments the decimal floating point counter by three, increasing the total decimal floating point counter to seven.

FIG. 16 is a mathematical operation performed by the loop shown in FIG. 15, in accordance with an illustrative embodiment. Continuing with loop 1500 shown in FIG. 15, adding the value of "X" plus "TAX" to "SUM" results in 4.3978, as shown by arrow 1604 in FIG. 16. This operation is an aligned operation producing a bias of two in favor of a long representation. Thus, the counter associated with long representation is incremented by two. However, since MathContext.DECIMAL64 is used on the operation, a bias of five is added to the decimal floating point counter. Thus, the total decimal floating point counter is increased to twelve. Adding "TAX" to "TXSUM" is also an aligned operation, increasing the bias towards long representation by another two. As a result, the counter associated with long representation now has a value of four.

At the end of the first iteration, the bias is twelve to four in favor of decimal floating point representation. In this illustrative example, the tolerance "T" is set to twenty. Because the difference between the counters is equal to 12−4=8, the preferred representation for numbers remains the long representation because the difference between the counters, 8, is less then the tolerance "T" for changing the representation type. Therefore, the preferred representation remains long.

On the second iteration, the value of "X"=1.05 is used. Following the same logic as above, the following biases are generated for the decimal floating point representation counter: 4 for constructing a decimal object from a string, 6 for two unaligned additions of "X"+"TAX"+"SUM", 5 for using MathContext.DECIMAL64, and 3 for unaligned addition of "TAX"+TX"SUM". In contrast, the bias counter for long representation is not incremented in this particular iteration. Thus, the counter associated with decimal floating point representation is at 12+4+6+5+3=30, whereas the counter for long representation is still at 4.

Accordingly, at the end of the second iteration the difference between the counters is equal to 30−4=26. Because the tolerance threshold is "T"=20, which is less than the counter difference of 26, the BigDecimal class switches to a default decimal floating point representation. In other words, future BigDecimal objects or classes that are instantiated with regard to the loop shown in FIG. 15 are represented using the decimal floating point representation type.

FIG. 17 shows an exemplary output of the loop shown in FIG. 15, including the showing of when a change should be made from a first number representation type to a second representation type, in accordance with an illustrative embodiment. The table shown in FIG. 17 summarizes the results for the first two iterations described above and also provides the results for the remaining four iterations.

As can be seen in table 1700, the preferred format type for numbers begins at long representation, which is a base-two representation. Long representation remains as the preferred representation type for the second iteration. As shown in cells 1702 and 1704, the decision to use the long representation type is not a good decision with respect to the loop shown in FIG. 15, because the difference between the long counter in column 1704 and the decimal floating point counter shown in column 1706 is rapidly diverging in favor of decimal floating point representation. In other words, the loop shown in FIG. 15 is most efficient when using decimal floating point representation. However, after only two iterations the number representation type changes because tolerance "T" equals twenty. In this case, the decision to switch to decimal floating point representation is considered to be a good decision, as shown with respect to cells 1708, 1710, 1712, and 1714.

Note that a delay occurs before a change in representation type occurs, due to the presence of tolerance "T". This delay increases or decreases depending on the assigned value of tolerance "T". This delay can be referred to as "hysteresis." The exact value of tolerance "T" is assigned by a user or automatically by a data processing system based on policies established by a user.

FIG. 18 is an exemplary loop of operations of a software program, in accordance with an illustrative embodiment. The loop shown in FIG. 18 uses the same relative bias as the loop shown in FIG. 15. Thus, the relative biases for operations shown in loop 1800 of FIG. 18 are shown in table 1400 of FIG. 14. Additionally, the tolerance "T" for the loop shown in FIG. 18 is set to 20. The loop shown in FIG. 18 can be implemented in a data processing system, such as data processing system 100 shown in FIG. 1, data processing system 200 shown in FIG. 2, or data processing system 1100 shown in FIG. 11.

Loop 1800 is similar to, but different than, loop 1500 shown in FIG. 15. In particular, loop 1800 converts integer data to a format of BigDecimal "X". Loop 1800 then multiplies "X" with a BigDecimal tax rate "TAX" (0.10) to produce a value of "TAX". Loop 1800 then adds "X" and "TAX" to a running BigDecimal "SUM". Loop 1800 then adds "TAX" to a running BigDecimal sum "TXSUM"".

In an illustrative embodiment, an input stream of six values for "X" is provided. In particular, "X"=3.99, "X"=1.05, "X"=1.10, "X"=5.21, "X"=2.50, and "X"=9.32. On the first iteration of loop 1800, "X"=3.99.

The construction of a BigDecimal number from an integer has a bias of three in favor of the long representation. Accordingly, the counter for long representation is incremented by three. In turn, multiplying the number "X" by a ten percent tax results in "TAX"=0.399, but generates no additional bias towards either representation type.

FIG. 19 is a mathematical operation performed by the loop shown in FIG. 18, in accordance with an illustrative embodiment. Adding "X" and "TAX" requires padding "X"=3.99 with a zero, as shown by operation 1900 in FIG. 19. In particular, the number zero shown at arrow 1902 is added so that an aligned operation between number 3.990 shown at arrow 1904 and number 0.399 shown at arrow 1906 results in the addition to number 4.389 as shown by arrow 1908. This addition is unaligned, which results in a bias of three in favor of decimal floating point representation. Accordingly, the counter associated with decimal floating point type representation is incremented by three.

The operation of adding "X"+"TAX" to "SUM" is an aligned operation, which provides a bias of two towards long representation. Adding "TAX" to TX"SUM" is also an aligned operation, increasing the bias towards long representation by another two. As a result of these two operations, the counter associated with long representation is incremented to a value of 3+2+2=7. At the end of the first iteration, the difference between the counters is 7−3=4 in favor of a long representation. This value is less then tolerance "T"=20 and, in addition, this value favors long representation; therefore, the representation type of numbers associated with loop 1800 remains in the long 64-bit base-two representation.

On the second iteration of loop 1800, the value of "X" is 1.05. Following the same logic as above, the following increments to the counters are generated. For the long representation type counter, three is added for constructing a BigDecimal object from an integer, two is added for aligned addition of "X"+"TAX"+"SUM", and two is added for aligned addition of "TAX"+TX"SUM". Conversely, 3 is added to the decimal floating point representation counter for unaligned addition of "X"+"TAX". When the difference between the counters is inspected, tolerance "T" is still less than 20 and long representation is still preferred. Therefore, the preferred number representation remains the 64-bit base-two number representation type.

FIG. 20 shows exemplary output of the loop shown in FIG. 18, including the showing of when a change should be made from a first number representation type to a second representation type, in accordance with an illustrative embodiment. Table 2000 shows a summary of the results of each of the six iterations for loop 1500 shown in FIG. 15.

As shown in table 2000, the preferred format for loop 1500 shown in FIG. 15 is the long 64-bit base-two representation type for numbers. As the iterations increase, the divergence between the long counter and the decimal floating point counter is continuing to increase. Therefore, the preferred format of the long representation is likely to remain the same and the decision to use the long representation as the preferred format is good for each iteration because the long representation type is the most efficient representation type with respect to loop 1500 of FIG. 15.

At the end of the second iteration the difference between the counters is equal to 14−6=8 in favor of long representation types for numbers. Thus, the long representation type for numbers is retained.

FIG. 21 shows exemplary pseudo code for defining two counter types, in accordance with an illustrative embodiment. The pseudo code shown in FIG. 21 can be implemented in a data processing system, such as data processing system 100 shown in FIG. 1, data processing system 200 shown in FIG. 2, or data processing system 1100 of FIG. 11.

In particular, the pseudo code shown in FIG. 21 sets two counter types, counter "A" and counter "B". Each counter tracks biasing for a given representation type. The pseudo code shown in FIG. 21 can be expanded for multiple counter types should multiple representation types of numbers be desired. The pseudo code shown in FIG. 21 shows that a flag is set for representation type "A". Thus, the representation type for numbers is defaulted to representation "A". In an illustrative embodiment, the default could be decimal floating point representation, long 64-bit base-two representation, or some other representation type.

FIG. 22 shows exemplary pseudo code for incrementing counters, in accordance with an illustrative embodiment. The pseudo code shown in FIG. 22 can be implemented in a data processing system, such as data processing system 100 shown in FIG. 1, data processing system 200 shown in FIG. 2, or data processing system 1100 shown in FIG. 11.

In particular, the pseudo code shown in FIG. 22 can be used to update a first counter and/or a second counter based on relative biases of the particular operation with respect to number representation types. Specifically, the pseudo code shown in FIG. 22 operates in conjunction with the pseudo code shown in FIG. 21. In the pseudo code shown in FIG. 22, when an operation is biased in favor of a first representation type, then counter "A" is incremented by a value associated with that bias. Conversely, if an operation is biased towards a second representation type associated with counter "B" then counter "B" is incremented by a value associated with the second bias.

FIG. 23 shows exemplary pseudo code for determining whether a difference between two counters exceeds a threshold, in accordance with an illustrative embodiment. The pseudo code shown in FIG. 23 can be implemented in a data processing system, such as data processing system 100 shown in FIG. 1, data processing system 200 shown in FIG. 2, or data processing system 1100 shown in FIG. 11.

The pseudo code shown in FIG. 23 demonstrates calculating a difference between two counters and the changing of a flag type if the difference between the counters exceeds a threshold value "T". Thus, the pseudo code shown in FIG. 23 operates in conjunction with the pseudo code shown in FIG. 21 and FIG. 22 to achieve an exemplary embodiment of the present invention. In the illustrative embodiment shown in FIG. 23, the pseudo code generates a difference between counter "A" and counter "B" and, if that difference exceeds value "T", then the flag is changed to an alternate representation type. In this example, the flag is changed from type "A" to type "B". As a result, a new representation type is used.

Figure 24:
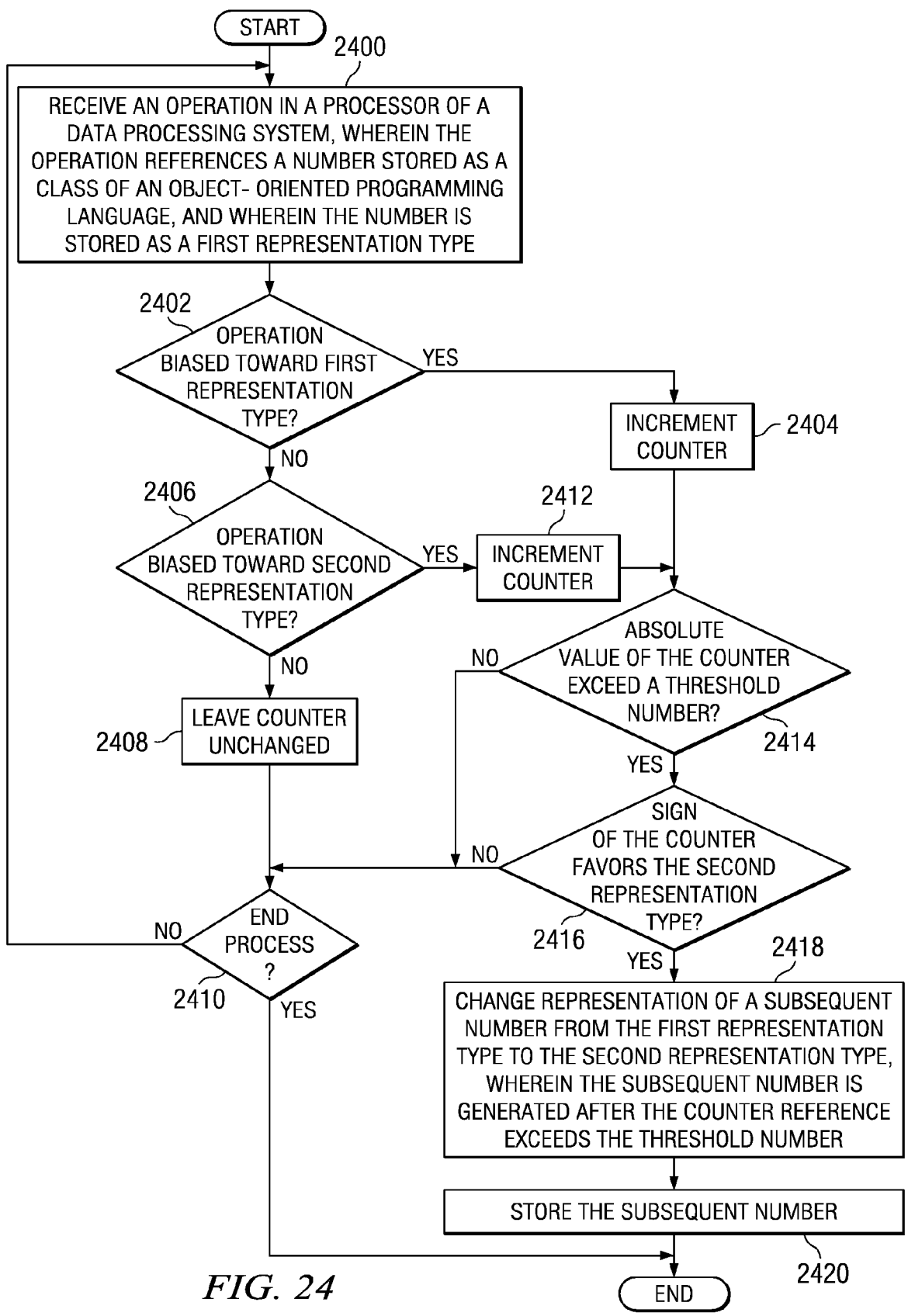
FIG. 24 is a flowchart illustrating a process for determining when to change a representation type of numbers stored in a data processing system, in accordance with an illustrative embodiment.

FIG. 24 is a flowchart illustrating a process for determining when to change a representation type of numbers stored in a data processing system, in accordance with an illustrative embodiment. The process shown in FIG. 12 can be implemented in a data processing system, such as data processing system 100 shown in FIG. 1, data processing system 200 shown in FIG. 2, and data processing system 1100 shown in FIG. 11. The processes shown in FIG. 12 can be performed by a processor, such as processor 1102 shown in FIG. 11.

The process begins as a processor receives an operation, wherein the operation references a number stored as a class of an object-oriented programming language, and wherein the number is stored as a first representation type (step 2400). A representation type can be a base-ten representation type, as shown in FIG. 3 or a base-two representation type, as shown in FIG. 4. A class of an object-oriented programming language can be a BigDecimal number in a variety of formats, as shown with respect to FIG. 6 through FIG. 9.

Continuing the process, the processor determines whether the operation is biased towards the first representation type (step 2402). A bias towards a first representation type can be a bias as described with respect to FIG. 10 and with respect to FIG. 14 through FIG. 20. If the operation is biased towards the first representation type at step 2402, then the processor increments the counter (step 2404). However, if the operation is not biased towards the first representation type at step 2402, then the processor determines whether the operation is biased towards the second representation type (step 2406).

If the operation is not biased towards the second representation type at step 2406, then the counter is left unchanged (step 2408). The processor then determines whether to end the process (step 2410). If the process is to continue, then the process returns to step 2400 and repeats. Otherwise, the process terminates.

Returning to step 2406, if the operation is biased towards the second representation type, then the counter is decremented (step 2412). Similarly, as mentioned above at step 2402, if the operation is biased towards the first representation type, then the counter is incremented (step 2404). After both cases, the processor determines whether the absolute value of the counter exceeds a threshold number (step 2414). The threshold number can be any user-defined or computer-determined number. If the absolute value of the counter does not exceed a threshold number, then the process returns to step 2410 and proceeds accordingly.

However, if the absolute value of the counter does exceed a threshold number, then the processor determines whether a sign of the counter favors the second representation type (step 2416). If the sign of the counter does not favor the second representation type, then the process returns to step 2410 and proceeds accordingly. However, if the sign of the counter favors the second representation type, then the processor proceeds to step 2418. As can be seen, satisfaction of (or a 'yes' determination to) both steps 2414 and 2416 results in the process moving to step 2418. In this case, the processor changes the representation of a subsequent number from the first representation type to the second representation type, wherein the subsequent number is generated after the counter exceeds the threshold number (step 2418). In an illustrative embodiment, the processor stores the subsequent number (step 2420). Storing is provided for reference only, as the processor could take other actions after performing step 2418. The process terminates thereafter.

Thus, the illustrative embodiments described herein provide for a method of determining when to change representation types of numbers used with respect to applications in a data processing system. Because the illustrative embodiments described herein detect which number representation type produces the most efficient execution of an application, the illustrative embodiments described herein also increase the overall efficiency with which applications are executed. Thus, applications may be executed more quickly.

Aspects of the present invention provide for a computer implemented method, computer program product, and data processing system for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a first counter is incremented. Responsive to the operation being biased towards a second representation type, a second counter is incremented. The second representation type is different than the first representation type. A counter reference is calculated. The counter reference is equal to a first value of the first counter subtracted from a second value of the second counter. Responsive to the counter reference exceeding a threshold number, representation of a subsequent number is changed from the first representation type to the second representation type. The subsequent number is generated after the counter reference exceeds the threshold number. For ease of reference, the subsequent number is stored.

Aspects of the present invention also provide for a computer implemented method for determining when to change a representation type of at least one number stored in a memory of a data processing system. An operation is received in a processor of the data processing system. The operation references a number stored as a class of an object-oriented programming language. The number is stored as a first representation type. Responsive to the operation being biased towards the first representation type, a counter is either incremented or decremented. Responsive to the operation being biased towards a second representation type, the counter is incremented or decremented opposite the manner in which the counter is incremented or decremented in response to the operation being biased towards the first representation type. The second representation type is different than the first representation type. Responsive to satisfaction of both an absolute value of the counter exceeding a threshold number and to a sign of the counter favoring the second representation type, representation of a subsequent number is changed from the first representation type to the second representation type. The subsequent number is generated after the counter reference exceeds the threshold number. Optionally, the subsequent number is stored.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer-readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining when to change a representation type of at least one number stored in a memory of a data processing system, the method comprising:
    receiving an operation in a processor of the data processing system, wherein the operation references a number stored as a class of an object-oriented programming language, and wherein the number is stored as a first representation type;
    responsive to the operation being biased towards the first representation type, incrementing a first counter;
    responsive to the operation being biased towards a second representation type, incrementing a second counter, wherein the second representation type is different than the first representation type;
    calculating a counter reference, wherein the counter reference is equal to a first value of the first counter subtracted from a second value of the second counter;
    responsive to the counter reference exceeding a threshold number, changing representation of a subsequent number from the first representation type to the second representation type, wherein the subsequent number is generated after the counter reference exceeds the threshold number; and
    storing the subsequent number.

2. The computer implemented method of claim 1 wherein the second representation type is a preferred representation type, wherein the preferred representation type comprises a representation type for which the operation can be processed more quickly relative to the first representation type.

3. The computer implemented method of claim 1 wherein changing representation further comprises changing representation of the at least one number stored in the memory of the data processing system, wherein at least one number generated prior to the counter reference exceeding the threshold number has a changed representation type.

4. The computer implemented method of claim 1 further comprising:
    responsive to the counter reference being less than or equal to the threshold number, retaining representation of the at least one number as the first representation type.

5. The computer implemented method of claim 1 wherein the first representation type is a base-two number representation system and the second representation type is a base-ten number representation system.

6. The computer implemented method of claim 1 wherein the first representation type is a base-ten number representation system and the second representation type is a base-two number representation system.

7. The computer implemented method of claim 1 wherein calculating and changing are performed responsive to instantiation of a new number stored as one of the class or a second class of the object-oriented programming language.

8. The computer implemented method of claim 1 wherein the first representation type and the second representation type are members of a set comprising three or more reference types.

9. The computer implemented method of claim 1 wherein the incrementing the first counter comprises incrementing the first counter by a value greater than one.

10. The computer implemented method of claim 1 wherein incrementing the second counter comprises incrementing the second counter by a value greater than one.

11. A computer program product comprising:
a computer usable medium having computer usable program code for determining when to change a representation type of at least one number stored in a memory of a data processing system, the computer program product including:
computer usable program code for receiving an operation in a processor of the data processing system, wherein the operation references a number stored as a class of an object-oriented programming language, and wherein the number is stored as a first representation type;
computer usable program code for, responsive to the operation being biased towards the first representation type, incrementing a first counter;
computer usable program code for, responsive to the operation being biased towards a second representation type, incrementing a second counter, wherein the second representation type is different than the first representation type;
computer usable program code for calculating a counter reference, wherein the counter reference is equal to a first value of the first counter subtracted from a second value of the second counter; and
computer usable program code for, responsive to the counter reference exceeding a threshold number, changing representation of a subsequent number from the first representation type to the second representation type, wherein the subsequent number is generated after the counter reference exceeds the threshold number.

12. The computer program product of claim 11 wherein the second representation type is a preferred representation type, wherein the preferred representation type comprises a representation type for which the operation can be processed more quickly relative to the first representation type.

13. The computer program product of claim 11 wherein changing representation further comprises changing representation of the at least one number stored in the memory of the data processing system, wherein at least one number generated prior to the counter reference exceeding the threshold number has a changed representation type.

14. The computer program product of claim 11 further comprising:
computer usable program code for, responsive to the counter reference being less than or equal to the threshold number, retaining representation of the at least one number as the first representation type.

15. The computer program product of claim 11 wherein the first representation type is a base-two number representation system and the second representation type is a base-ten number representation system.

16. The computer program product of claim 11 wherein the first representation type is a base-ten number representation system and the second representation type is a base-two number representation system.

17. The computer program product of claim 11 wherein calculating and changing are performed responsive to instantiation of a new number stored as one of the class or a second class of the object-oriented programming language.

18. The computer program product of claim 11 wherein the first representation type and the second representation type are members of a set comprising three or more reference types.

19. The computer program product of claim 11 wherein incrementing the first counter comprises incrementing the first counter by a value greater than one and wherein incrementing the second counter comprises incrementing the second counter by a value greater than one.

20. A data processing system comprising:
a bus;
at least one processor coupled to the bus;
a computer usable medium coupled to the bus, wherein the computer usable medium contains a set of instructions for determining when to change a representation type of at least one number stored in a memory of a data processing system, wherein the at least one processor is adapted to carry out the set of instructions to:
receive an operation in a processor of the data processing system, wherein the operation references a number stored as a class of an object-oriented programming language, and wherein the number is stored as a first representation type;
responsive to the operation being biased towards the first representation type, increment a first counter;
responsive to the operation being biased towards a second representation type, increment a second counter, wherein the second representation type is different than the first representation type; and
calculate a counter reference, wherein the counter reference is equal to a first value of the first counter subtracted from a second value of the second counter; and
responsive to the counter reference exceeding a threshold number, change representation of a subsequent number from the first representation type to the second representation type, wherein the subsequent number is generated after the counter reference exceeds the threshold number.

21. A computer implemented method for determining when to change a representation type of at least one number stored in a memory of a data processing system, the method comprising:
receiving an operation in a processor of the data processing system, wherein the operation references a number stored as a class of an object-oriented programming language, and wherein the number is stored as a first representation type;
responsive to the operation being biased towards the first representation type, doing one of incrementing or decrementing a counter;
responsive to the operation being biased towards a second representation type, doing the other of incrementing or decrementing the counter, wherein the second representation type is different than the first representation type;

responsive to satisfaction of both an absolute value of the counter exceeding a threshold number and to a sign of the counter favoring the second representation type, changing representation of a subsequent number from the first representation type to the second representation type, wherein the subsequent number is generated after the counter reference exceeds the threshold number; and storing the subsequent number.

22. A computer program product comprising:

a computer usable medium having computer usable program code for determining when to change a representation type of at least one number stored in a memory of a data processing system, the computer program product including:

computer usable program code for receiving an operation in a processor of the data processing system, wherein the operation references a number stored as a class of an object-oriented programming language, and wherein the number is stored as a first representation type;

computer usable program code for, responsive to the operation being biased towards the first representation type, doing one of incrementing or decrementing a counter;

computer usable program code for, responsive to the operation being biased towards a second representation type, doing the other of incrementing or decrementing the counter, wherein the second representation type is different than the first representation type; and computer usable program code for, responsive to satisfaction of both an absolute value of the counter exceeding a threshold number and to a sign of the counter favoring the second representation type, changing representation of a subsequent number from the first representation type to the second representation type, wherein the subsequent number is generated after the counter reference exceeds the threshold number.

23. A data processing system comprising:

a bus;

at least one processor coupled to the bus;

a computer usable medium coupled to the bus, wherein the computer usable medium contains a set of instructions for determining when to change a representation type of at least one number stored in a memory coupled to the bus, wherein the at least one processor is adapted to carry out the set of instructions to:

receive an operation in a processor of the data processing system, wherein the operation references a number stored as a class of an object-oriented programming language, and wherein the number is stored as a first representation type;

responsive to the operation being biased towards the first representation type, do one of incrementing or decrementing a counter;

responsive to the operation being biased towards a second representation type, do the other of incrementing or decrementing the counter, wherein the second representation type is different than the first representation type; and responsive to satisfaction of both an absolute value of the counter exceeding a threshold number and to a sign of the counter favoring the second representation type, change representation of a subsequent number from the first representation type to the second representation type, wherein the subsequent number is generated after the counter reference exceeds the threshold number.

\* \* \* \* \*